US007178099B2

(12) United States Patent
Meyer et al.

(10) Patent No.: US 7,178,099 B2
(45) Date of Patent: Feb. 13, 2007

(54) META-CONTENT ANALYSIS AND ANNOTATION OF EMAIL AND OTHER ELECTRONIC DOCUMENTS

(75) Inventors: David Meyer, Palo Alto, CA (US); Steven Miller Bernstein, Cupertino, CA (US)

(73) Assignee: Inxight Software, Inc., Sunnyvale, CA (US)

( * ) Notice: Subject to any disclaimer, the term of this patent is extended or adjusted under 35 U.S.C. 154(b) by 917 days.

(21) Appl. No.: 09/767,810

(22) Filed: Jan. 23, 2001

(65) Prior Publication Data

US 2002/0143871 A1    Oct. 3, 2002

(51) Int. Cl.
G06N 3/00    (2006.01)

(52) U.S. Cl. ....................................... 715/513
(58) Field of Classification Search ............. 707/3, 707/4, 2; 717/145; 709/218, 206, 246, 204; 715/501.1, 531, 523, 521, 517, 513, 833, 715/603, 530; 345/833, 603
See application file for complete search history.

(56) References Cited

U.S. PATENT DOCUMENTS

| | | | | |
|---|---|---|---|---|
| 4,715,010 A | | 12/1987 | Inoue et al. | 364/705 |
| 4,774,697 A | | 9/1988 | Alhara | 368/41 |
| 4,872,005 A | | 10/1989 | DeLuca et al. | 340/825.44 |
| 4,965,763 A | * | 10/1990 | Zamora | 704/1 |
| 5,050,071 A | | 9/1991 | Harris et al. | 364/200 |
| 5,204,960 A | * | 4/1993 | Smith et al. | 717/145 |
| 5,220,540 A | | 6/1993 | Nishida et al. | 368/41 |
| 5,283,856 A | | 2/1994 | Gross et al. | 395/51 |
| 5,283,887 A | | 2/1994 | Zachery | 395/500 |
| 5,367,621 A | | 11/1994 | Cohen et al. | 395/154 |
| 5,530,852 A | | 6/1996 | Meske et al. | 395/600 |

(Continued)

OTHER PUBLICATIONS

Engst, Adam C., Visual Quickstart Guide: Eudora For Windows & Macintosh, 1997, Peachpit Press, pp. 22-24.*

Primary Examiner—Stephen Hong
Assistant Examiner—Kyle Stork
(74) Attorney, Agent, or Firm—Ernest J. Beffel, Jr.; Haynes Beffel & Wolfeld LLP

(57) ABSTRACT

Meta-content analysis and annotation upon the body of email documents, and other electronic documents, and to create a displayable index of these instances of meta-content, which is sorted and annotated by type are provided. In addition, the electronic document is enhanced by providing links for the semantic foci to external documents containing related information. An electronic document adapted for delivery to one or more recipients, the electronic document including a header and a body, is processed by:

performing meta-content extraction of semantic foci within said header and said body, the semantic foci comprising a plurality of type of information including one or more of email addresses, URLs, dates, currency values, organization names, names of people, names of places, and phone numbers;

creating a meta-content index the document based upon said extracted semantic foci;

arranging the meta-index according to said plurality of types;

combining said meta-content index with said header and said body to provide an enhanced document; and sending said enhanced document to said one or more recipients via a communication network.

The process includes converting the electronic mail document to a markup language format, and wherein said meta-content index comprises one or more objects expressed in said markup language adapted for presentation with body in said enhanced document.

89 Claims, 8 Drawing Sheets

U.S. PATENT DOCUMENTS

| | | | |
|---|---|---|---|
| 5,555,346 A | 9/1996 | Gross et al. | 395/51 |
| 5,566,330 A * | 10/1996 | Sheffield | 707/4 |
| 5,623,242 A | 4/1997 | Dawson et al. | 340/311.1 |
| 5,644,692 A * | 7/1997 | Eick | 345/833 |
| 5,696,539 A * | 12/1997 | Welti et al. | 345/603 |
| 5,708,825 A * | 1/1998 | Sotomayor | 715/501.1 |
| 5,710,883 A * | 1/1998 | Hong et al. | 709/246 |
| 5,732,216 A * | 3/1998 | Logan et al. | 709/203 |
| 5,774,845 A | 6/1998 | Ando et al. | 704/231 |
| 5,784,608 A * | 7/1998 | Meske et al. | 707/2 |
| 5,801,702 A * | 9/1998 | Dolan et al. | 715/854 |
| 5,802,253 A | 9/1998 | Gross et al. | 395/51 |
| 5,832,480 A * | 11/1998 | Byrd et al. | 707/5 |
| 5,838,323 A | 11/1998 | Rose et al. | 345/349 |
| 5,848,191 A | 12/1998 | Chen et al. | 382/229 |
| 5,893,916 A * | 4/1999 | Dooley | 715/523 |
| 5,907,841 A | 5/1999 | Sumita et al. | 707/6 |
| 5,923,848 A | 7/1999 | Goodhand et al. | 395/200.49 |
| 5,924,108 A | 7/1999 | Fein et al. | 707/531 |
| 5,944,787 A | 8/1999 | Zoken | 709/206 |
| 5,953,732 A | 9/1999 | Meske et al. | 707/513 |
| 5,958,006 A | 9/1999 | Eggleston et al. | 709/219 |
| 5,974,446 A * | 10/1999 | Sonnenreich et al. | 709/204 |
| 5,978,820 A | 11/1999 | Mase et al. | 707/531 |
| 6,026,374 A | 2/2000 | Chess | 705/26 |
| 6,026,387 A * | 2/2000 | Kesel | 706/52 |
| 6,032,132 A * | 2/2000 | Nelson | 705/34 |
| 6,038,542 A | 3/2000 | Ruckdashel | 705/9 |
| 6,052,682 A | 4/2000 | Miller et al. | 707/3 |
| 6,052,717 A * | 4/2000 | Reynolds et al. | 709/218 |
| 6,058,435 A | 5/2000 | Sassin et al. | 709/305 |
| 6,112,210 A * | 8/2000 | Nori et al. | 707/103 R |
| 6,138,130 A * | 10/2000 | Adler et al. | 715/503 |
| 6,138,149 A * | 10/2000 | Ohmura | 709/218 |
| 6,161,130 A * | 12/2000 | Horvitz et al. | 709/206 |
| 6,192,165 B1 * | 2/2001 | Irons | 382/306 |
| 6,253,231 B1 * | 6/2001 | Fujii | 709/206 |
| 6,311,195 B1 * | 10/2001 | Hachiya et al. | 715/512 |
| 6,446,061 B1 * | 9/2002 | Doerre et al. | 707/3 |
| 6,446,118 B1 * | 9/2002 | Gottlieb | 709/217 |
| 6,457,143 B1 * | 9/2002 | Yue | 714/43 |
| 6,490,589 B1 * | 12/2002 | Weider et al. | 707/100 |
| 6,533,822 B2 * | 3/2003 | Kupiec | 715/531 |
| 6,721,715 B2 * | 4/2004 | Nemzow | 705/26 |
| 6,772,141 B1 * | 8/2004 | Pratt et al. | 707/3 |
| 6,820,237 B1 * | 11/2004 | Abu-Hakima et al. | 715/531 |

* cited by examiner

CAP Ventures
Cornell University
DOCUMENTUM
DSS
Documentum
FileNET
IBM
Interleaf
International
Business
Machines
Corporation
   Knowledge
Management
Associates
   MCI
Communications
Corporation
   MIT
   Microsoft
   Netscape
Communications
Corporation
   Novell
   Pre-Competitive
Foundation for the
Knowledge
Management
Market
   Qwest
Communications
International, Inc.
   SAP
   Yahoo

/ 815

Content and Connectivity

I want to use the word "content" in a very general sense. Not just as in "content management" -- but as a general term for all the "stuff" that your products manage -- scanned images, text, web pages,
tables, XML, whatever. Next week we can go back to using the word
in its more restricted form, having to do with "web stuff" -- but this week I need it as a big, general term.

Virtually all of our vendor clients sell software that focuses on content in some way -- authoring it, managing it, finding it, converting it, viewing it.. Consequently, we typically write to you about matters that relate to content -- XML for example.

But -- and here is the point of this week's essay -- looking ONLY at
content keeps you from seeing the bigger picture and understanding what is behind all of this CHANGE in the way we handle and use content. Said another way: understanding the forces that are driving
change in our content-focused businesses requires looking beyond content.

WHY "CAUSE" IS IMPORTANT

That all sounds pretty abstract, and so it's worth spending some time
to explain why this is important. It has to do with predicting future developments. If you could identify the two or three things that were really driving all of the big, long term changes in the ways businesses are using content, then you'd be in a better position
to analyze and track these key "drivers" and make some educated guesses about what the next change will be, and maybe even when it
might happen.

For example, I have recently been spending a lot of time looking at the changes in the markets for electronically based transactions -- the new style of EDI that uses web-based technologies. I have been
trying to answer questions like, "Just how fast will paper based

Fig. 7B

META-CONTENT ANALYSIS AND ANNOTATION OF EMAIL AND OTHER ELECTRONIC DOCUMENTS

BACKGROUND OF THE INVENTION

1. Field of the Invention

The present invention relates to electronic documents intended for transmission to recipients, such as email documents produced and transmitted by electronic mail services. The invention also relates to the creation, extraction, presentation and other actions related to meta-content for such documents.

2. Description of Related Art

The present format typical email documents is analogous to that of the isolated page of text before the advent of hypertext linking. With the exception of sender-specified attachments and in-line universal resource locators (URL's), email documents are, for the most part, static text. Semantic foci within the text of email documents are often difficult to identify for use by recipients.

Meta-content has been used for analyzing electronic documents in a variety of settings. Such meta-content may be descriptive matter, extrapolation, summary and/or interpolation of content that enables one to use or understand that content more easily, or in a new or more useful way. Meta-content need not be directly derived from the related contents but may have a more general relationship thereto. For example, storage of content, age of content, history of access to content, opinions about content, ratings of the content or many more types of information can be coded and associated with electronic documents as meta-content.

Typically meta-content extraction from documents has been done by the person desiring to analyze the documents, or organize documents he or she receives. Thus, to effectively use meta-content extraction techniques, each person receiving a document is required to have tools like "Thing Finder SDK" software provided by Inxight Software, Inc. (Santa Clara, Calif.).

It is desirable therefore to apply meta-content extraction and organization techniques to electronic documents, like email documents, in a manner that simplifies the use and management of such electronic documents for recipients.

SUMMARY OF THE INVENTION

The present invention provides systems, methods and articles of manufacture to perform meta-content analysis and annotation upon email documents, and other electronic documents, and to create a displayable index of these instances of meta-content, which is sorted and annotated by type in one embodiment. Such analysis and annotation is done prior to receipt by the addressee, in on aspect of the invention. In addition, the invention enhances the electronic document by providing links for named entities to external documents containing related information. In some embodiments, the meta-content analysis includes summarization, and the annotation includes a summary of all or part of the electronic document.

Some lexical items within an email document contain greater inherent semantic weight (e.g. dates, email addresses, names of people, names of organizations), but receive no special markings and can thereby become lost in the noise of the surrounding text. Such items are known as "handles" or semantic foci. According to the present invention, the data represented at the points of semantic focus are extracted to provide meta-content, and receive presentation embellishment or other annotation, not only facilitating reference to them, but providing for indexation of them which can serve as a useful means of summarization and precis (a concise summary of essential points, statements, or facts) for recipients of the electronic document.

A method according one embodiment of the present invention for processing an electronic document adapted for delivery to one or more recipients, the electronic document including a header and a body, includes:

performing meta-content extraction of semantic foci within said document, including one or more of the header, the body and any attachments, the semantic foci comprising a plurality of types of information including one or more of email addresses, URLs, dates, currency values, organization names, names of people, names of places, phone numbers, names of products, names of drugs, names of diseases, names of sports teams and other information providing semantic focus within the document;

creating a meta-content index the document based upon said extracted semantic foci;

arranging the meta-index according to said plurality of types;

combining said meta-content index with said header and said body to provide an enhanced document; and sending said enhanced document to said one or more recipients via a communication network.

As mentioned before, one embodiment provides for summarization of the body and/or the attachments. One embodiment uses information about the subject of the electronic document, such as information from a subject line in an email document header, as a basis of the summarization.

In one embodiment the process includes converting the electronic mail document to a markup language format, and wherein said meta-content index comprises one or more objects expressed in said markup language adapted for presentation with body in said enhanced document. The meta-content index in one embodiment, comprises labels facilitating parsing of the enhanced document. The electronic document provided as input to the process comprises, in one embodiment, a document in a format compliant with a standard MIME format.

In one embodiment of the invention, wherein said semantic foci includes at least one date within the body, the process includes identifying a document date within the header; and associating a presentation attribute, such as color to said at least one date in said index, the presentation attribute based upon a relationship between the document date and the at least one date. The process includes converting the at least one date to canonical form to facilitate analysis of the dates for presentation. In a similar fashion, where one of the plurality of types comprises currency values, the process includes converting the currency values to a canonical form.

In addition or as an alternative, the process includes annotating said semantic foci within the body. The process in another embodiment includes color coding the electronic version of said index and the semantic foci in said body according to the plurality of types of information.

According to yet another embodiment, the process includes associating a hyperlink with one of said extracted semantic foci, and incorporating the hyperlink into one or both of the meta-content index and said body.

The process provides in one embodiment for adding presentation attributes to entries in said meta-content index according to said plurality of types, and according to relationships among entries within said one of said plurality of types.

Various embodiments of the invention take the form of a data processing method, an article of manufacture providing machine readable software for executing the process, and a computer system including an email client and resources coupled with the email client for providing the process.

Other aspects and advantages of the present invention can be seen on review of the drawings, the detailed description and the claims which follow.

BRIEF DESCRIPTION OF THE FIGURES

FIGS. 7A–7B together provide a black and white version of an excerpt of an electronic mail document generated using the analysis and annotation resources of the present invention, as displayed by a recipient.

DETAILED DESCRIPTION

In general, the invention comprises a system to perform meta-content analysis and annotation of an outbound email, or other electronic documents. A preferred embodiment of the system includes the following components:
1. A system to separate the body of an email from the email header.
2. A system to open attachments within the email.
3. A system to extract the email send date from the email header.
4. A system to perform named entity meta-content extraction across the email body and attachments, and optionally the email header.
5. A system to normalize the email send date, instances of dates with the email body and attachments, and instances of currency within the email body and attachments to canonical (conforming to a general rule or acceptable procedure) representations.
6. A system to color-code dates, appearing both in the meta-content index and in the email body, to indicate temporal proximity to the email send date.
7. A system for displaying in the meta-content index color-coded sorted lists of plurality of types of semantic foci, including but not limited to, email addresses, URLs, organization names, names of people, place names, disease names, drug names, sports team names, other special interest categories of names, products or subjects, and phone numbers.
8. A system for indicating by color-coded annotation within the email body instances of the semantic foci.
9. A system for creating hyperlinks within the email body to external HTML documents for semantic foci.
10. A system to convert ASCII special characters to HTML ampersand characters.
11. A system for summarizing text, or other information, in the email body and attachments.

Figure 1:
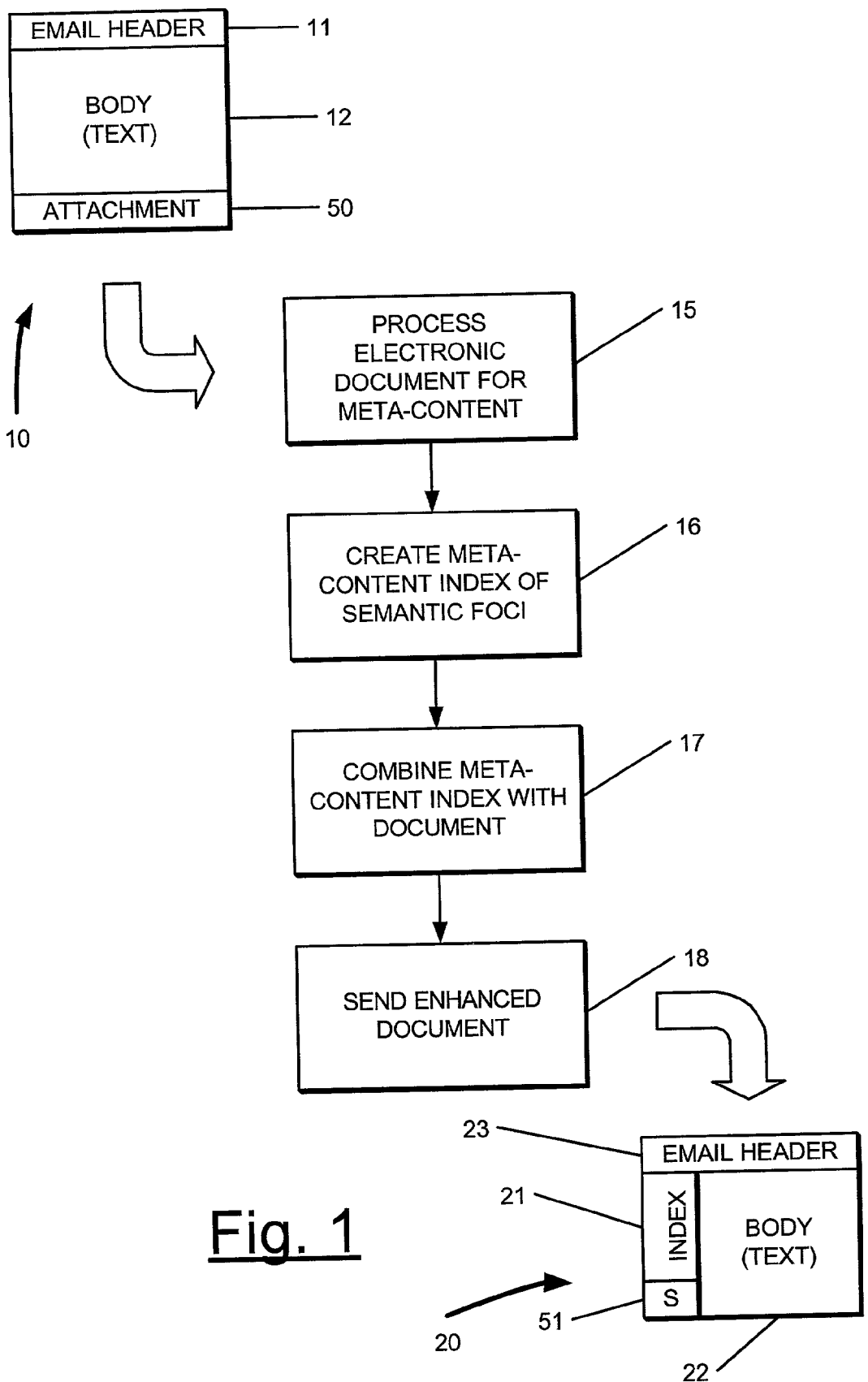
FIG. 1 illustrates a basic process according to the present invention.

FIG. 1 illustrates the basic process of the present invention. An electronic document 10 is received, typically from an email client program, or other process used to compose an electronic mail document, having a header 11 and a body 12, intended to be sent to one or more recipients who are identified for example, within the header of the electronic document. In some embodiments, the document 10 includes an attachment 50 or attachments. The document 10 is processed using meta-content analysis and annotation processes (step 15). An index is created based on semantic foci identified (step 16). The index of meta-content is combined in step 17 with the header and body of the document 10 to produce an enhanced document 20. The enhanced document is sent to the recipient or recipients (step 18). The enhanced document includes an index 21, a body 22 and a header 23. The body 22 and header 23, are substantially the same as the header 11 and the body 12 of the input document 10 in one embodiment, or a version of the body 12 and header 11 of the input document 10 translated into a markup language in another embodiment. In one embodiment, the body is enhanced with, for example, color coding and links between semantic foci in the document and corresponding entries in the index 21. The index 21 is laid out using a markup language in a margin of the body as displayed. Thus the index 21 may appear upon display, as a list of foci organized by type and by relationship on the left margin of the displayed page.

In this example, a summary 51 of the attachment is included in the index. In some embodiments, a summary of the body is included. In some embodiments, summaries of the body and of the attachment or attachments are included in the enhanced document. Alternate embodiments may provide such summaries in locations other than the left margiin, such as in a top margin of the as displayed, enhanced document.

In one embodiment, the meta-content analysis and annotation process includes a summarizing process, by which concise summaries of the text in the body, the text in the attachment, or the text in both the body and the attachment are produced, and included in the index field 21, or in an additional field of the enhanced document.

Figure 2:
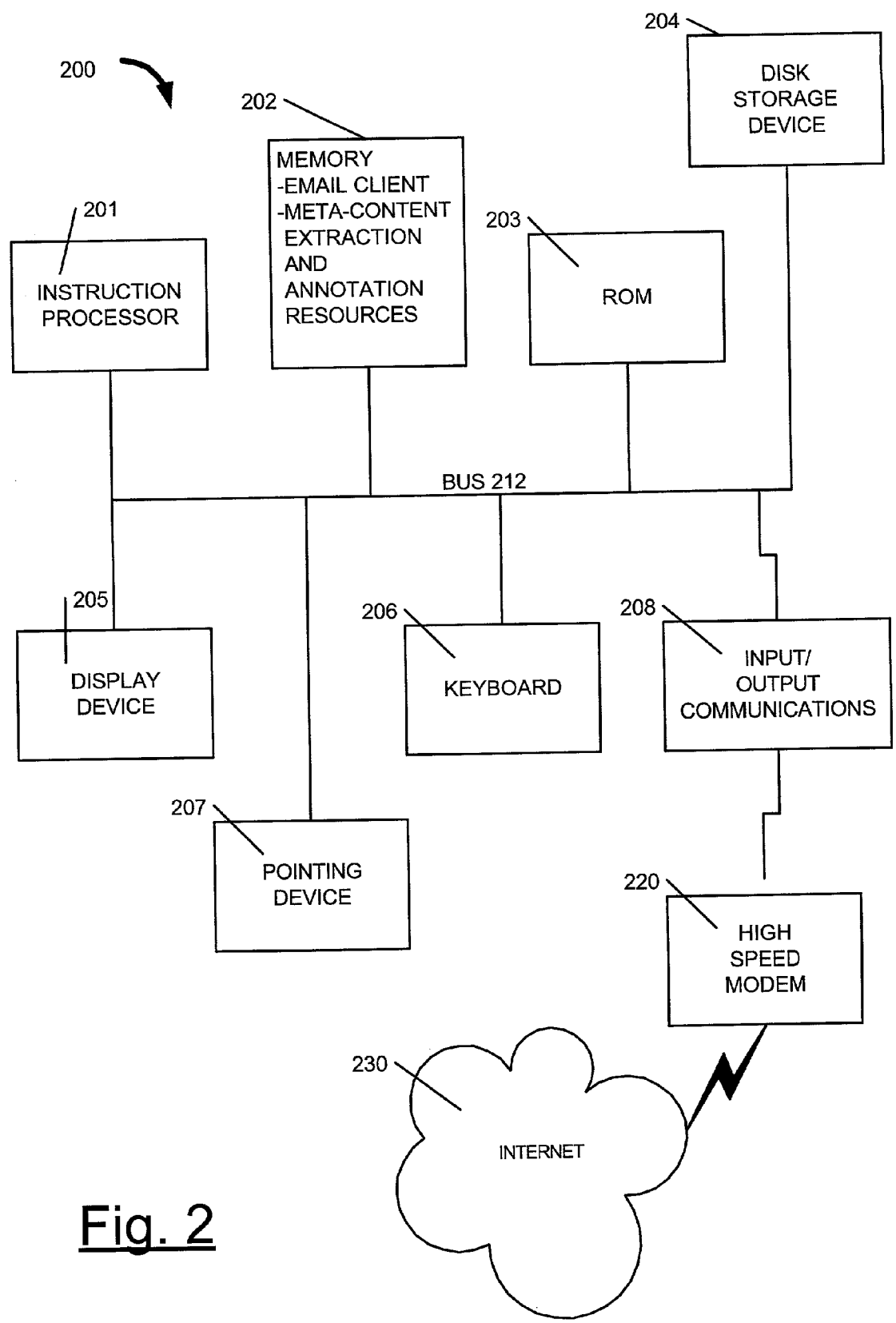
FIG. 2 is a block diagram representative of a computer system including meta-content analysis and annotation resources according to the present invention.

FIG. 2 illustrates a block diagram of a computer and connection to the Internet such as the commonplace PC personal computer.

Reference is made to FIG. 2 illustrating a block diagram of a computer system 200 upon which the present invention may be implemented or practiced. Computer system 200 is connected to the Internet in a conventional manner (many connection modes, e.g. Ethernet, are well known in the relevant arts). It is to be appreciated that Computer system 200 is exemplary only and that the present invention can operate within a number of different computer systems including general-purpose computers systems, personal computer workstations, and others. In the following discussions of the present invention, certain processes and steps are realized as a series of instructions (e.g., firmware program) that reside within computer readable memory units of system 300 and executed by processors of system 200.

In general, computer system 200 used by the present invention comprises:

Address/data bus 212 for conveying information and instructions,

Micro-processor (MPU) or other similar instruction processor 201 coupled with bus 212 for processing information and instructions.

A random access memory (RAM) or system memory 202 for storing digital information and programs during execution.

A read-only memory (ROM) 203 for storing information and instructions of a more permanent nature.

An input/output serial communicating interface 208 for interfacing with modem 208 to exhange messages with other users (not shown) of the Internet 230. Alternatively, internet access may be provided across other communication network interfaces, such as ethernet interfaces.

Also in included according to the present invention, the computer includes an email client, such as Microsoft Outlook, Netscape Messenger, or a variety of other email client programs which are commercially available. Email clients include resources to compose electronic mail documents according to standard formats, including formats complaint with MIME standards.

The ROM 203 typically stores system firmware (BIOS—Basic/Input Output System) instruction codes in accordance with the present invention. Disk storage device 204 provides non-volatile read-write storage for OS, application programs and data including text documents, headers for text documents, email messages and other entities. A person of ordinary skill in the art will understand that the memories may also contain additional information such as applications programs, network communication programs (e.g., UDP and other IP based protocols), diagnostic firmware, data, etc.

Moreover, computer system 200 may typically, but need not, include:

a display device 205 for displaying information to a computer user, an alphanumeric input device 206 (e.g., keypad), and a pointing device 207 such as a computer mouse.

The computer includes resources, e.g. computer programs stored in the memory 202 and non-volatile memory 204 for providing meta-content analysis and annotation of content, the content being in the form of documents. A particular embodiment of this invention is used with outgoing email documents; however, this invention is applicable to other kinds of documents. In an alternate embodiment of the invention, the analysis and annotation resources reside with an email server, such as with an SMTP server, in communication with the computer 200 in the path of outgoing mail.

The analysis and annotation resources provide the following processes:

1) Separating the Email Body from the Header

Only the body, or both the body and the header, of the outbound email will undergo meta-content analysis and annotation. The email header typically includes limited meta-content related to semantic foci, other than a document date which indicates a document send date or a document creation date for instance.

It is necessary to extract the email send date, or other document date, in order that dates found within the body of the email may be displayed in a color-coded markup by temporal proximity to the document date.

2) Named Entity Extraction System

Commercially available software that returns instances of named entity meta-content data found within the body of an email (e.g. dates, people, organizations) is included in one embodiment. The software used in the preferred embodiment includes Thing Finder SDK available from Inxight Software, Inc., Santa Clara, Calif.

3) Summarization

Commercially available software is included that returns a text summary of one or both of the message body and any text-centric files (i.e., attached files might contain images as well, but are not pure image files) attached to the message (attachments) and enhance the document by including that summary in the index, or as a separate field in the enhanced document. Furthermore, one embodiment uses the words in the message subject line (part of the Header) as weighting elements to help create the summaries (see http://www.inxight.com/products_wb/summary_server/index.html, particularly "Specific concepts, words or phrases can also be emphasized, while others can be de-emphasized to fine-tune your summaries") using, in a preferred embodiment, the Summary Server available from Inxight Software, Inc., Santa Clara, Calif.

4) Normalization of Instances of Dates and Currency to Canonical Representation

Surface forms of date and currency are normalized in order that further processes might be performed on them.

In one example, an instance of a date, in both the index and in the annotated email body, will be color-coded to indicate whether the date occurred before the email send date, will be occurring within 7 days, will be occurring within 30 days, or will occur beyond 30 days in the future. Typically, an email send date is of the format (D)D<space><capital_initial_3_letter_month_abbreviation><space>CCYY (eg "2 Feb. 2000"). For the send date to be compared to dates of various formats in the email body (eg "The fourth of July, 1776", or "May 17, 1995"), all dates are first normalized using for example the ISO 8601 date format CCYY-MM-DD (eg "2000 Feb. 2", "1776 Jul. 4", "1995 May 17").

Commercially available software is used for date and currency normalization. In the preferred embodiment it is the normalization functionality of Inxight's Thing Finder SDK, referred to above.

5) Color-Coding Dates to Indicate Temporal Proximity to Email Send Date

In one approach, both the email send date (or other document date) and the dates found within the body of the email are normalized, as mentioned above. A number between 1 and 366 is determined for the month and year of the email send date corresponding to the sequential number of that day within the year. The same operation is applied to the date within the body of the email that is to be compared.

If the email body date contains no information for year, then a year is assumed according to a heuristic such as for one example, the following:

A. If the email body date is in either November or December, and the email send date is in either January of February, assume that the body date occurs in the year prior to the send date.

B. If A is not true, and if the email body date is in one of the two previous months, the same month, or in a later month then the month of the email send date, then assume that the body date is in the same year as the send date.

C. If the email body date is more than two months prior to the email send date month, then assume that the body date occurs in the year prior to the send date.

The email body date and the email send date are next compared.

In one example, there are four types of color-coding to indicate temporal proximity between an email body date and the email send date. In this example, the most vivid color serves to indicate body dates that will occur within 7 days in the future of the send date. A somewhat less vivid color indicates body dates that will occur from 8 to 30 days in the future of the send date. A still less vivid color indicates body dates occurring after 30 days in the future of the send date. The most dull color will indicate body dates that have occurred before the email send date. This method of color-coding is the same for display of dates in the meta-content index, as well as in the annotated email body. Other color coding or annotation schemes may be used as well.

The dates in the meta-content index are displayed chronologically. To improve legibility, however, they are converted to a common format, such as: <capital_initial_3_letter_month_abbreviation><period><space>DD <comma> <space>CCYY (eg "Jul. 4, 1776"), rather than remaining in the sort and comparison format (eg "1776-07-04").

6) Displaying Color-Coded Sorted Lists in the Meta-Content Index

Instances of meta-content data are sorted alphabetically by category, and displayed in the meta-content index. Color-coding is applied according to super-category grouping. One color is selected to indicate contact categories (email addresses, URLs, phone numbers), another color is for people, and another is for organizations.

7) Annotation by Color-Coding of Instances of Meta-Content Data within the Email Body The same color-coding scheme deployed in the meta-content index is used to annotate the surface forms of the instances of meta-content data within the body of the email. In addition, currency is annotated by color-coding in the email body, even though it does not appear in the meta-content index.

8) Creating Hyperlinks to External HTML Documents for Organizations and Currency The surface forms of instances of organizations and currency meta-content data are additionally marked up with HTML anchor tags.

For organizations, the webpage referenced provides related information. For currency, the ISO normalized representation is included as an argument in a URL that brings up a webpage of current exchange rates.

9) Converting ASCII Special Characters to HTML Ampersand Characters

Because the original plain text email is being converted into an annotated HTML file, any ASCII special characters must be converted into HTML ampersand characters to ensure correct parsing.

One application of this invention is to electronic mail (email). Common formats for the body of a typical email data packet are plain text and Hypertext Markup Language (HTML). HTML is well known in the art and exists in several variations. HTML, as it is applied in emails, is primarily directed to typographic markup (e.g. italics, bold, fonts, point-size, color).

A sample of annotated outbound email is provided below in an HTML text format, and in FIGS. 7A–7B in an as displayed format.

In the present embodiment, meta-content includes the send date of each of a number of email messages, other reference dates, email addresses, telephone numbers, URL's, names of persons, names of organizations to list a few representative possibilities. Meta-content is extracted from a document (i.e. from original content) and then presented in a way to make it easier for the readers to take note of. For example, the extracted data may be sorted according to type (e.g. date, email address, telephone number, etc. . . . ) and then displayed in a meta-context index mapped to the original document. In visual presentation, the leftmost column (left margin) of a text document is customarily be used to contain one or more meta-context indexes. For visual presentation devices with color capabilities, each category within such meta-content is typically delineated by the use of a distinctive color for each of the various categories. Subcategories of meta-content categories could be delineated also with different colors or other display and/or typographical capabilities. For example, the dates could be sub-categorized according to their temporal proximity to a document send date through the use of distinctive color saturation. In this example, the closer the date is to the send date, the more saturated the color used in displaying that date. Thus color temperature (hue) and purity (saturation) provides at least two dimensions of color encoding. A preferred embodiment discussed herein converts an original flat text email into an annotated HTML file. However, other mark-up languages could be used.

Figure 3:
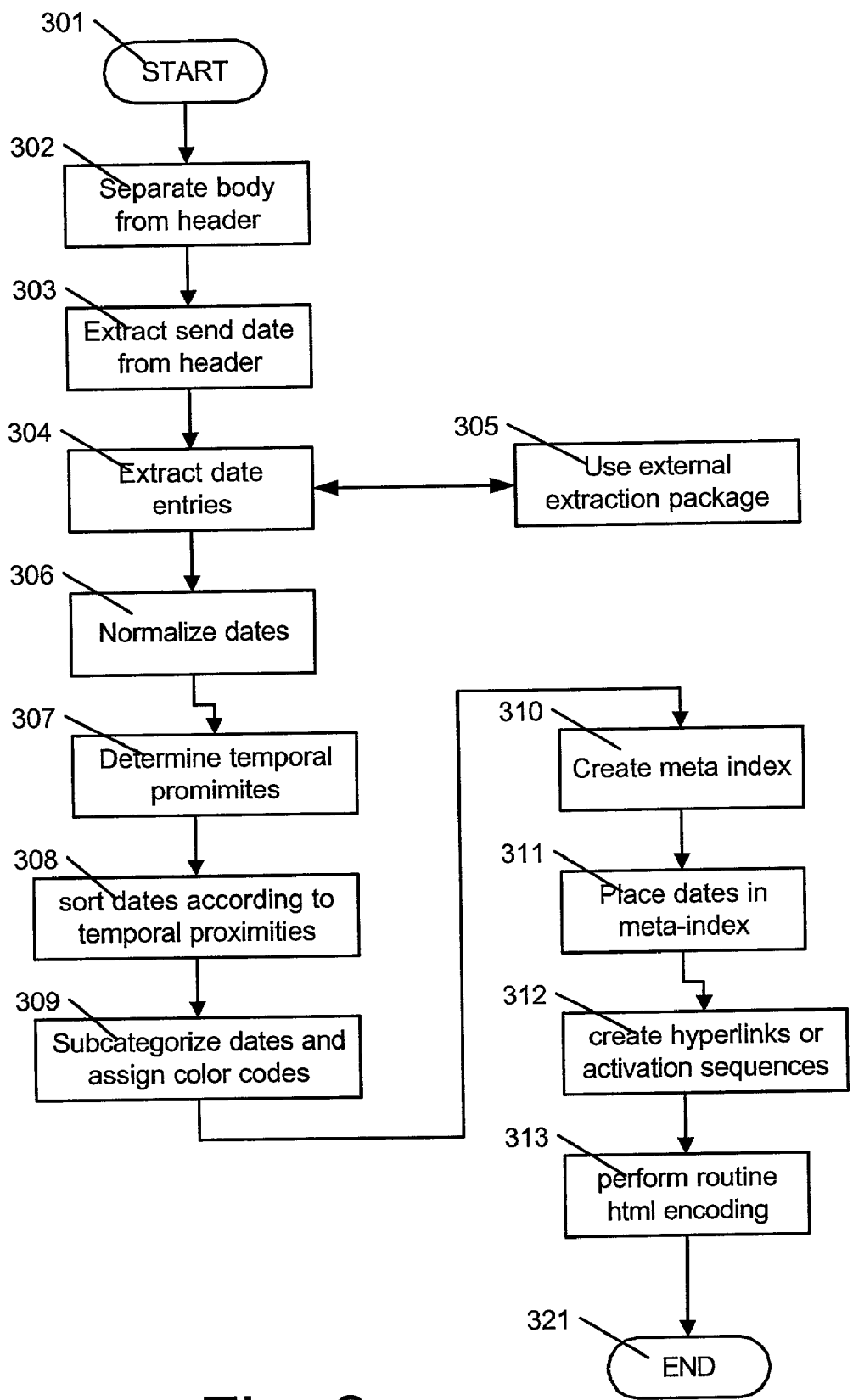
FIG. 3 is a flow chart of a basic process for analysis and annotation of an email document according to the present invention.

According to one embodiment of the invention messages which have been prepared for transmission by an email client are processed with regard to dates referenced therein. In the present embodiment the message may be received as flat text and is encoded into HTML as part of processing. Alternatively the message may be received already encoded into HTML and may be process into different HTML sequences. Referring to FIG. 3, the method for processing a flat text message starts in box 301, and in box 302 the email message is decomposed into header and body (a method to achieve this is discussed below). Next in box 303 the "send date" of the message (or other document date) is identified using an algorithm such as the one discussed herein in connection with FIG. 3. Then, in box 304, date entries are extracted from the body of the message, an external software package (box 305) may be used to perform this extraction, for example the "Thing Finder SDK" software by Inxight Software, Inc. is available for this purpose. In box 306, the dates so extracted are then normalized, that is converted to a common format, and in box 307, temporal proximities of the dates (e.g. number of days into the future or past relative to the message "send date"). In box 308, the dates are sorted with the oldest dates first and the newer dates later. Sorting dates is well known in the arts. Then in box 309 the dates are sub-categorized and HTML based color codes are assigned to each category. For example there might be three categories being (1) dates prior to the send date (2) dates up to two weeks after the send date and (3) dates more than two weeks after the send date. Then in box 310 a meta-index is created in the body of the message. For example a new version of the message may be created by copying the message within computer memory, but with the addition of additional data bytes which represent the meta-index. A meta-index or "meta-content index" is meta-content arranged as an index. An index, in this sense, may be an array of index entries where each entry contains a tag field (a date in the present example embodiment) together with an associated reference. For example in the present example embodiment, a reference might be the line number(s) within the document where the tag (the date) is used. In box 311, the extracted dates are placed in the meta-index as index entry tags. In box 312 references corresponding to each index entry are created as HTML hyperlinks or other activation sequences. Finally, in box 313, routine processing to ensure consistency and correctly terminate the document is performed. Such techniques are well known in the art, for example characters used as escape sequences in HTML (such as the ASCII X3.4 representation of a "less-than" sign which used as an openbracket sequence in HTML) must be encoded into appropriate own particular escape sequences (often commencing with an ampersand character). The present method terminates in box 321.

Alternative, more general, embodiments exist implementing more features than just dates. One particular embodiment comprises several parts: (1) separating the email body from the header, (2) extracting the email send date, (3) extracting various named entities, (4) executing a summarization process to produce a document summary, (5) normalization of dates and currency, (6) color-encoding dates, (7) sorting and displaying dates, (8) annotation by color-coding, (9) creating hyperlinks to external HTML documents, and (10) converting special characters to HTML ampersand characters.

In order to separate the email body from the header comprised within an electronic message, one must understand or determine the format of that message. In compliance with the RFC standards, electronic mail messages are composed of two parts, namely a header and a body. Whenever an email is communicated, by convention the header is transmitted first and when an entire email message is assembled in immediate access memory (typically RAM) the header occupies contiguous lower memory address and the body is adjoining. The body of an electronic mail message is more or less free-format, whereas the header consists essentially of a number of header-items each of which conforms to a particular standard. One example algorithmic approach to separating the body from the header using searching for a particular character string according to the standards for headers.

Figure 4:
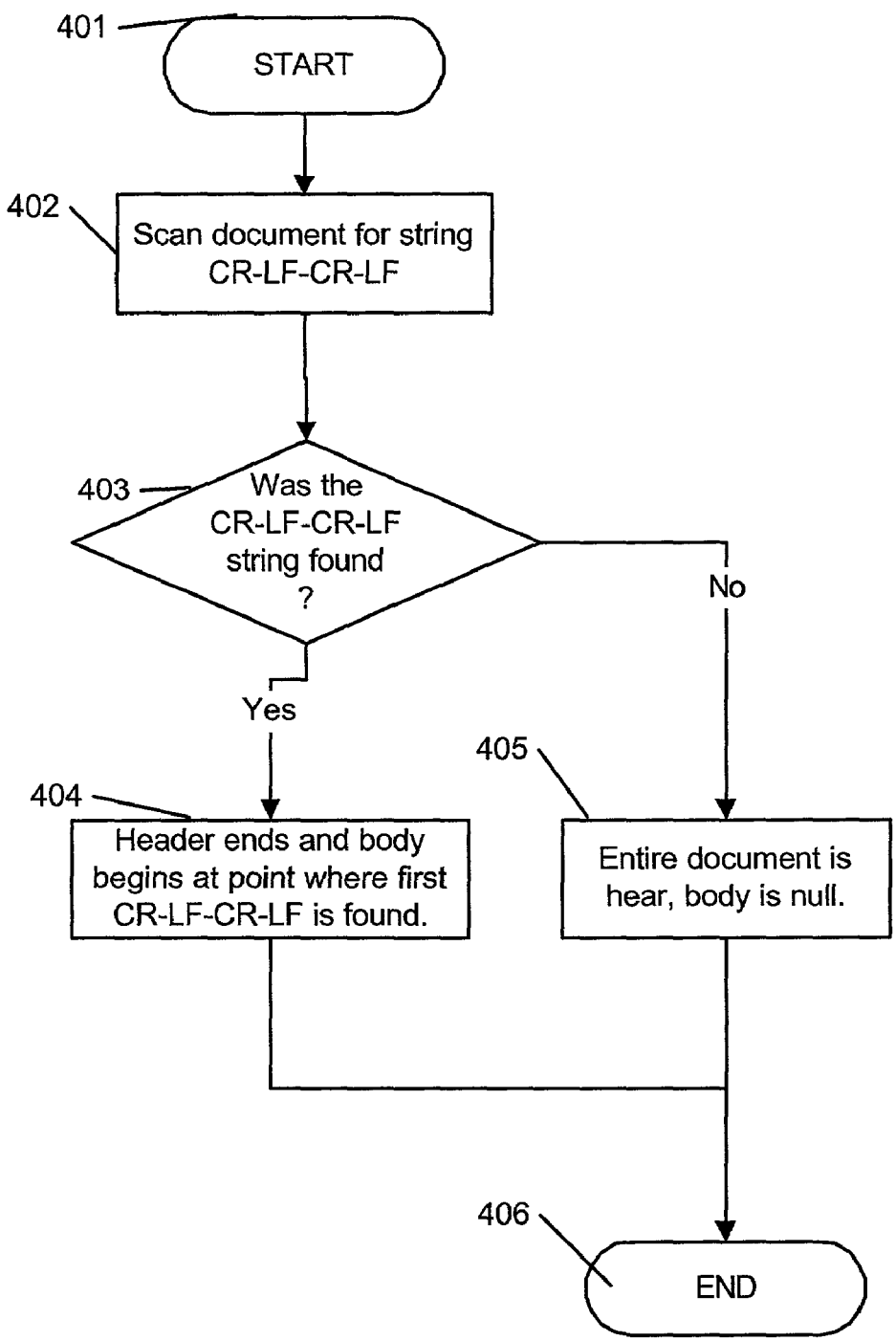
FIG. 4 is a flow chart of a basic process for separating an email header from an email body.

One example electronic mail header may have a format as follows:
From xxx@xxx
Received: from xxx
  xxxx
Message-Id:<xxx>
From: xxx>
To: xxx
Subject: Electronic document: This is an example message.
Date: Tue, 24 Aug 99 16:40:54-0700
MIME-Version: 1.0
Content-Type: multipart/alternative;
  boundary="--Electronic document-Multipart-Divider"
Content-Length: 5926
Status: RO
X-Status:
----Electronic document-Multipart-Divider
Content-Type: text/plain In the above example, the document is parsed to identify the divider type, for example the "electronic mail multipart divider." RFC 822 (1982) defined two consecutive CR-LF sequences as header-body dividers. In usual embodiments of the present invention, email headers are not edited nor supplemented. An example implementation of a method for separating header from body is shown in FIG. 4, referring to this Fig.: the method starts in box 401. In box 402, the document is scanned for presence of two consecutive CR-LF sequences. If the two consecutive CR-LF sequence is determined to be present (box 403), then in box 404 the header is identified as the first part of the message and the body is identified as the remainder of the message. Otherwise, in box 405, the entire message is the header and there is no body (the body is null). The method terminates in box 406.

Both the body and the header of each outbound email undergo meta-content analysis as is described herein, but annotations refer generally to only the body of the message, as the body typically carries the semantic foci of the electronic document.

A discussed above a message prepared for transmission by email consists of a header field and optionally a body separated from the header. The body consists of sequential lines containing ASCII characters. The message header contains headers-items. Each header-item has a field name (tag) and a field body separated by a colon and ending with a carriage-return or line feed. An example, a header-item field would have the format of "field name: field body" followed by carriage return (CR) and/or line feed (LF). The field name is printable ASCII. The field body maybe composed of any ASCII characters except CR or LF. This format enables the separation of field to be accomplished via a simple parser such as that shown in FIG. 4.

In messages, the "send date" (or other document date) field is found by parsing for the field name "Date:". The send date is the field body following the "Date:" field name. According to an aspect of the invention, the email "send date" is extracted from the email header and dates located (infra) within the body of the email may be compared to the email send date according to temporal proximity and annotated, displayed etc. accordingly. The "Date:" message header field is used as a source of "send date." However, according to the relevant RFCs (RFC 822, RFC1123 and RFC1036), a header-item introduced by "Date:" may properly refer to the date and time a message was written rather than the date and time the message was first submitted for transportation. In practice however many mail systems do indeed implement the "Date:" field as the date and time of submission. For Internet mail that enters the Internet from an X.400 gateway, "Date:" inevitably refers to submission date and time since that is required by the X.400 standard. In most practical cases it is unimportant to distinguish the two dates and times since the difference between them is both small and unimportant.

Figure 5:
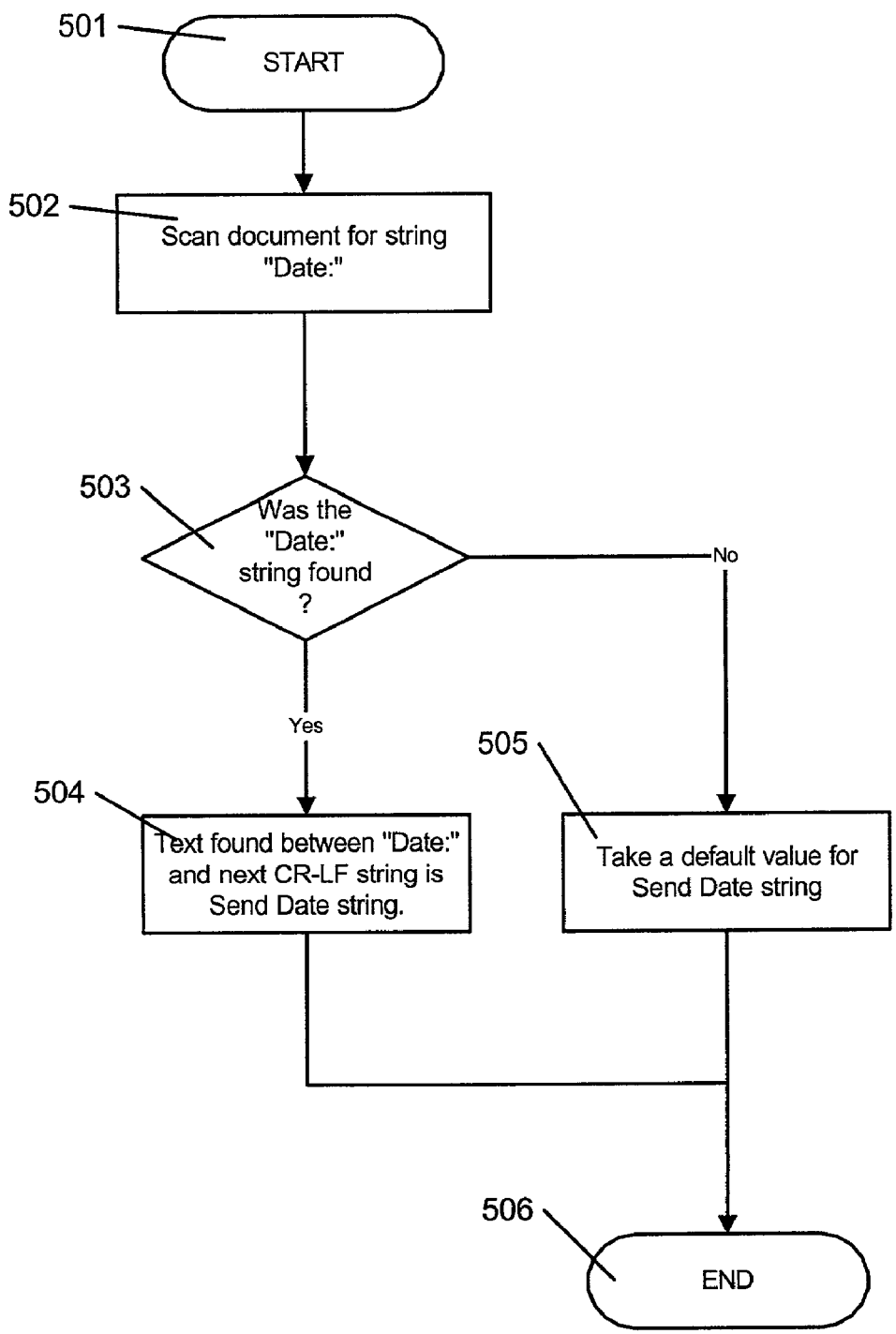
FIG. 5 is a flow chart of a basic process for extracting a document date from an email header.

Referring to FIG. 5, a method for extracting "send date" starts in box 501. In box 502 the document is scanned for the string "Date:". If the desired sting is found (box 503), then in box 504, the text after the desired string but before the next following CR-LF sequence is retained as the "send date". If no "Date:" string is found (box 505) then a default date, for example the actual present date is used as the "send date". The method ends in box 506.

An external extraction system is to find the named entities within the body of the email. It returns the location of the named entity that it found. Examples of named entities also known as "handles" are dates, names of people, names of organizations, etc. . . .

An external extraction system used in the preferred embodiment is Inxight's Thing Finder SDK. Thing Finder locates data and using Active Annotation(tm) finds, organizes, and presents additional text and relevant links which are presented in an easy to navigate pop-up box. According to an embodiment of the invention, the input to Inxight's Thing Finder SDK would include the message or document that will be parsed and the types of identified entities (handles) to be located. Examples of identified entity types are address, month, Internet address, city, noun group, region, company, organization, sports team name, drug name, disease name, subject category, other product name, state, country, percent, Social Security number, currency, person, time, date, telephone number, time period, day, miscellaneous proper name, measure, year, other place, product, Holiday, financial index, and person position. The output of Thing Finder (TM) is returned through an Application Programming Interface (API).

Instances of dates and currency are normalized to canonical (rigidly standardized) representation. Surface forms of date and currency are normalized so that further processing might be performed on them. An email send date is of the format (D)D <space><capital_initial_e_letter_month_abbreviation> <space>CCYY (e.g. "2 Feb. 2000"). For the send date to be compared to dates of various formats in the email body, all dates must first be normalized so that they can be compared. The preferred embodiment of this invention is to use ISO 8601 date format CCYY-MM-DD (e.g. "2000-02-02") for normalization. For example, dates inside the email body maybe "The fourth of July, 1776" or "5/17/95". These dates will be normalized to "1776-07-04" and "1995-05-17" and then compared to the send date of "2000-02-02" to determine temporal proximity. According to one embodiment of this invention, Inxight Thing Finder(tm) can be used to find the dates in the text and to normalize them.

One possible problem in comparing the send date to dates found in an email message body is that the latter may not include the year. In order to resolve this dilemma, the following rules, or something like them, are applied by the software used in an embodiment: 1) If the email body date is in either November or December, and the email send date is in either January or February, assume that the body date occurs in the year prior to the send date. 2) If number 1 isn't true, and if the email body date is in one of the two previous months, the same month, or in a later month than the month of the email send date, then assume that the body date is in the same year as the send date. 3) If the email body date is more than two months prior to the email send date month, then assume that the body date occurs in the year prior to the send date.

Dates are color-coded to indicate temporal proximity to the email send date. As already discussed, the send date and the dates within the body of the email will be normalized. Separate the dates according to year. Then within each year, a number between 1 and 366 is determined from the month and day of these dates. This enables easy comparison between the send date and the dates extracted from the email body. These dates are sub-categorized according to their temporal proximity to the send date. The sub-category that is closest to the send date (e.g. within 7 days) is assigned the brightest color, the next closest is assigned a somewhat less bright color (e.g. 8 to 30 days) and so on until the sub-category that is furthest from the send date is assigned the dullest color.

Figure 6:
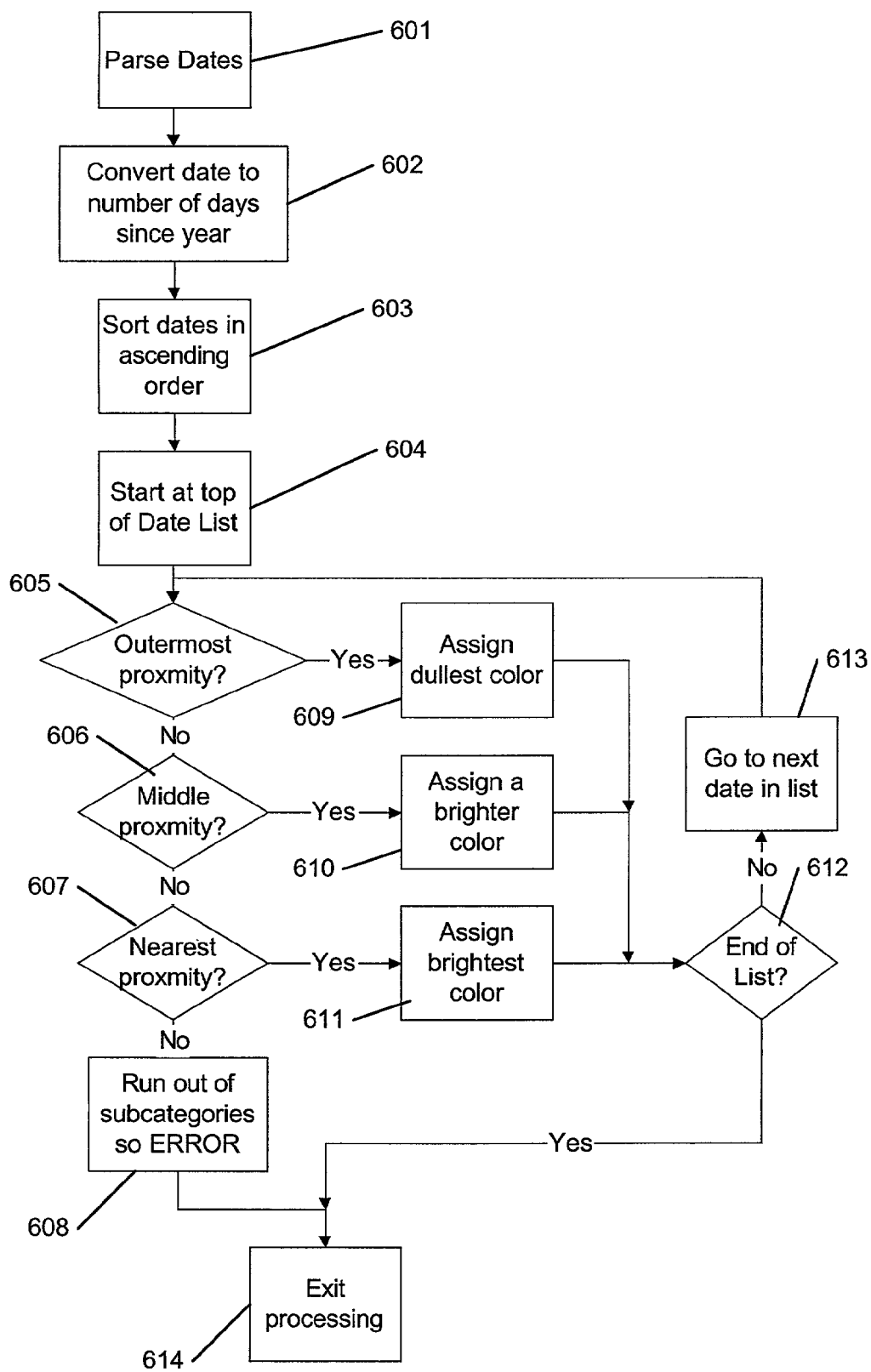
FIG. 6 is a flow chart of a basic process for color coding dates according to one aspect of the present invention.

According to FIG. 6, dates are parsed and separated into year, month, and day (box 601). In 602, the dates are converted to number of days from year. In other words, the month and day are combined to yield a number between 1 and 366. If the date is missing the year, an adjustment can be made according to the logic described herein prior to converting the date to number of days since year. In 603, the dates are sorted in ascending order. Then the method enters logic to determine the proximity of the dates to the "send date" starting at the top of the list 604. Each date in the sorted list is compared to the "send date" to determine its proximity to the "send date". In the drawing example, there are three categories of proximity: outermost, middle, and innermost. However, no way should it be construed from this illustration that the invention is limited to three categories.

In 605, a date from the list is compared to the "send date". If it is in the outermost proximity subcategory then the dullest color will be assigned (box 609). For example, the outermost subcategory maybe more than 30 days from the send date. If this date is not in the outermost subcategory, then it determines if this date is in the middle subcategory (box 606). For example the middle subcategory maybe 8 to 30 days from the send date. If this date is in the middle subcategory, a somewhat brighter color is assigned to this date (box 610). If this date isn't in the middle subcategory, then it determines if this date is in the nearest proximity to the send date (box 607). For example the nearest subcategory maybe within 7 days of the "send date". If this date is in the nearest subcategory, the brightest color is assigned to this date (box 611). If this date doesn't match any of the subcategories, then this is an error (box 608) and processing terminates (box 614).

However, normal processing results in a color being assigned in boxes 609, 610, or 611. Once color has been assigned, processing determines if the end of the dates list has been reached (box 612). If the end of the list has been reached, it exits processing (box 614); otherwise, it goes to the next date in the list (box 613) and proceeds to compare it to the "send date" (boxes 605, 606, and 607) to determine its proximity. This processing continues until all dates in the list are compared to the "send date".

For purposes of illustration, the ranges of "within 7 days", "8 to 30 days" and "more than 30 days" were used. However, the invention is not limited to these ranges.

After the named entities such as dates, names of people, names of organizations, etc. . . . are extracted, presentation attributes are associated with them. Examples of presentation attributes include but are not limited to color, font style, tool tips, flashing of named entity, etc. . . .

According to one embodiment of the invention, color coding is done using the HTML tag "color=" according to the HTML standards promulagted by the World Wide Web Consortium (w3c.org). Refer to Table 1 herein for a specific example.

Before displaying the dates, they may typically be converted to a convenient format other than ISO 8601. For example, standard Unix (tm) date format functions can be used to convert the dates to a desired format. The dates in the meta-content index will typically be displayed chronologically.

The document is parsed for handles. Examples of handles are dates, names, URLs, email addresses, etc. . . . This invention is not limited to this list of examples.

A meta-content entry is an individual entity which will make up the individual lines of the meta-content. Meta-content entries map one to one to handles in the document. The meta-content index are categories of individual meta-content entries. For example meta-content indexes are the set of dates, the set of email addresses, the set of phone numbers, the set of URLs, the set of people's names, the set of organization's names, etc.

Instances of meta-content data (handles) are sorted alphabetically by category and displayed in a meta-content index. Color-coding is applied according to super-category grouping. For example, one color could be selected to indicate contact categories (email addresses, URLs, phone numbers, etc. . . . ), another color is for names of people, and yet another color is for names of organizations. Sorting data is well known.

Instances of the meta-content data (handles) within the email body are also annotated with color-coding. For easy reference, the same color-coding scheme that was deployed in the meta-content index is used to annotate the surface forms of the instances of the meta-content data within the body of the email. In addition, currency is annotated by color-coding in the email body, even though it does not appear in the meta-content index. Furthermore, the meta-content entries in the meta-content index maybe hot linked to its handle within the document body. This is referred to as "indexed entries".

Hyperlinks to external HTML documents of organizations and currencies are created. The preferred embodiment for creating these hyperlinks is HTML anchor tags. For currency, the ISO normalized representation is included as an argument in a URL that brings up a web page of current exchange rates.

Because the original plain text email is being converted into an annotated HTML file, the ASCII special characters need to be converted to HTML ampersand characters. This is a well known technique in the art.

A recipient will display the meta-context data in the meta-context index. Referring to FIGS. 7A–7B the final user presentation of part of an example document after processing is illustrated. The actual HTML text of the entire document is set forth below. With reference to FIG. 7A, the main text area 801 is more-or-less a representation of the original flat text content prior to processing, with the text continuing in the following FIG. 7B, and beyond. Areas 810, 811, 812, 813, 814, 815 show representations of six meta-content indexes which have been created by processing according to an embodiment of the invention. The field 815 continues in FIG. 7B. In a color capable presentation means (typically color monitor or color ink jet printer as are well known in the arts), the index entries are displayed with color coding as described supra.

The dates in the Dates area 810 are coded by proximity to the document date. Thus, dates Mar. 17, 1988, Apr. 1, 1988, Apr. 7, 1988 ad Apr. 9, 1988 are expressed in the index in a purple tone, as falling within a certain relationship with the document date. Similarly, the dates Apr. 13, 1988 and Apr. 27, 1988 are expressed in the index in an orange tone, as falling within another relationship with the document date. Further, the dates within the body are colored to match. For example, the meta-content index entry "Apr. 27, 1998" in meta-content index 810 is derived from the corresponding content field 820, and the content field 820 is color coded (using HTML enhancement of the document) with the same color as the meta-index entry field. Similarly the content 821 identified as a telephone number is color coded in a magenta tone to match the corresponding meta-content index entry in the appropriate meta-content index 812. Meta-content index entries are also referred to by the alternative term "handles". In this example, the Email area 811, the Phone numbers area 812 and the URLs area 813 are all colored with a magenta tone, as are the corresponding foci in the body. The entries in the People area 814 and the corresponding foci in the body are coded green. The entries in the Organization area 815 and the corresponding foci in the body are coded blue. Organization entries, and the corresponding foci in the body are also tagged with hyperlinks where available. Other tags such as email addresses for named people can also be included in the body and/or in the index.

Figure 7A:
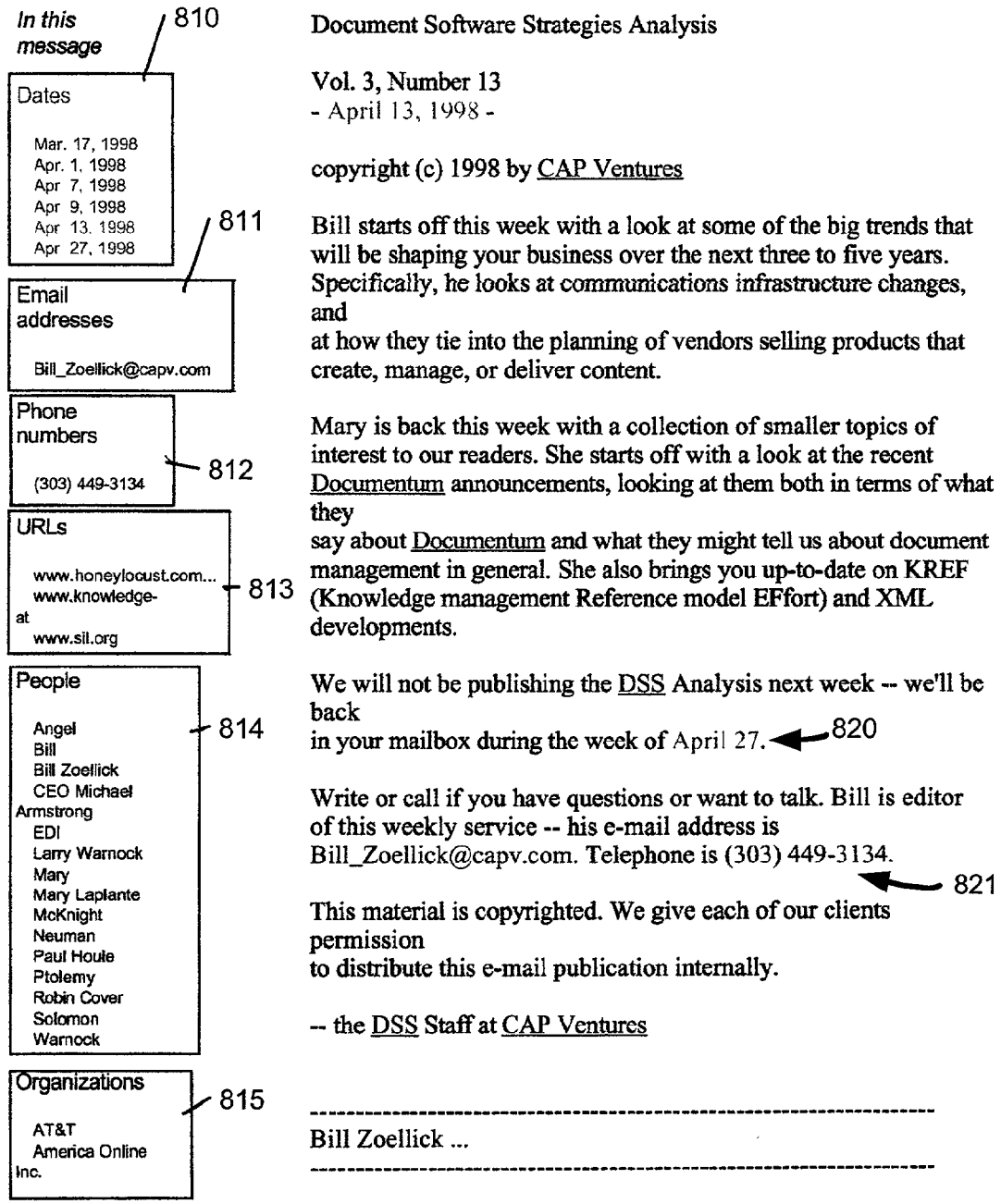

Portions of an HTML file for expressing the image partially displayed as shown in FIGS. 7A–7B, are provided in Table 1, including markup to encode a meta-content index and a portion of the document body for one embodiment of the invention.

TABLE 1

Start of HTML file and Meta-context Index

```
<html>
<body link=#0000ff alink=#000a0 vlink=#0000a0>
<table cellspacing=10>
<tr>
<td width=110 valign=top
```
Dates inside of Meta-context Index

```
<font color=#ff6000 face=arial size=2>
Dates
<br><br>
</font>
<font color=#804040 face=arial size=1>· Mar. 17, 1998</font><br>
<font color=#804040 face=arial size=1>· Apr. 1, 1998</font><br>
<font color=#804040 face=arial size=1>· Apr. 7, 1998</font><br>
<font color=#804040 face=arial size=1>· Apr. 9, 1998</font><br>
<font color=#ff6000 face=arial size=1>· Apr. 13, 1998</font><br>
<font color=#d03000 face=arial size=1>· Apr. 27, 1998</font><br>
<br>
```
Email addresses inside of Meta-context Index

```
<font color=#a000a0 face=arial size=2>
Email addresses
<br><br>
</font>
<font color=#a000a0 face=arial size=1>
· Bill_Zoellick@capv.com<br>
<br>
```
Phone numbers inside of Meta-context Index

```
<font color=#a000a0 face=arial size=2>
Phone numbers
<br><br>
</font>
<font color=#a000a0 face=arial size=1>
· (303) 449-3134<br>
<br>
....
```

TABLE 1-continued

URLs inside of Meta-context Index

```
<font color=#a000a0 face=arial size=2>
URLs
<br><br>
</font>
<font color=#a000a0 face=arial size=1>
· www.honeylocust.com...<br>
· www.knowledge-at<br>
· www.sil.org<br>
<br>
...
```

People inside of Meta-context Index

```
<font color=#006400 face=arial size=2>
People
<br><br>
</font>
<font color=#006400 face=arial size=1>
· Angel<br>
· Bill<br>
<br>
...
```

Organizations inside of Meta-context Index

```
<font color=#0000a0 face=arial size=2>
Organizations
<br><br>
</font>
<font color=#0000a0 face=arial size=1>
· AT&T<br>
· America Online Inc.<br>
...
```

End Meta-context Index

```
</td>
```

Text from Message Body

```
<td valign=top>
br>
     Document Software Strategies Analysis<br>
          <br>
       Vol. 3, Number 13<br>
       - <font color=#ff6000>April 13, 1998</font> -<br>
<br>
     copyright (c) 1998 by <font color=#0000a0><a
href="http://www.hoovers.com/cgi-bin/co_search?which=company&query_string=CAP+Ven
tures&dir_top_id=8" target="_blank">CAP Ventures</a></font><br>
          <br>
<font color=#006400>Bill</font> starts off this week with a look at some of the big trends
that<br>
will be shaping your business over the next three to five years.<br>
Specifically, he looks at communications infrastructure changes, and<br>
at how they tie into the planning of vendors selling products that<br>
create, manage, or deliver content.<br>
<br>
<font color=#006400>Mary</font>is back this week with a collection of smaller topics
of<br>
interest to our readers. She starts off with a look at the recent<br>
<font color=#0000a0><a
href="http://www.hoovers.com/cgi-bin/co_search?which=company&query_string=Document
um&dir_top_id=8" target="_blank">Documentum</a></font> announcements, looking at
them both in terms of what they<br>
say about <font color=#0000a0><a
href="http://www.hoovers.com/cgi-bin/co_search?which=company&query_string=Document
um&dir_top_id=8" target="_blank">Documentum</a></font>and what they might tell us
about document<br>
End of HTML file
</tr>
</table>
</body>
</html>
```

Table 1 includes excerpts of the HTML language file for the Index and Body of the message produced by analysis and annotation according to one embodiment of the invention. Underlined text in each box of the table provides a label for the segment, but is not part of the HTML file.

The Meta-content Index includes markup for font color. Likewise the body text includes annotation in the form of font color, and links for semantic foci. For example, in the body, the named entity "Documentum" which appears as flat text in the input email document is converted to annotated text with a hyperlink expressed in HTML as "<font color=#0000a0><a href="http://www.hoovers.com/cgi-bin/co_search?which=company&query$_{13}$string=Documentum&dir_top_id=8" target="_blank">Documentum</a></font>." Other examples can be seen on review of the Table. The full text of the email is not included in the Table 1, nor in FIGS. 7A and 7B for conciseness.

Thus the present invention enables performing named entity meta-content analysis and annotation upon the body of outbound email, and displaying an index of these instances of meta-content sorted and color-coded by category. In addition, the invention enables enhancement of email by providing links for named entities to external documents containing related information.

Overall, the present invention provides for the production of more efficient class of email documents, or other electronic documents for delivery to others, which includes meta-content as an object produced prior to delivery, embedded in the document and displayable by a recipient without special purpose software. The resulting enhanced documents are easier to analyze, organize and study than documents of the prior art.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for processing an electronic document adapted for delivery to one or more recipients, the electronic document comprising an electronic mail document including a header and a body, the method comprising:
    processing the electronic document using a program to automatically identify semantic foci;
    creating a meta-content index corresponding to said semantic foci comprising one or more objects expressed in a markup language adapted for presentation with the body of the electronic document; and
    combining said meta-content index with the header and the body to provide an enhanced document.

2. The method of claim 1, including sending the enhanced electronic document to said one or more recipients.

3. The method of claim 1, wherein said electronic document comprises a document in a format compliant with a standard MIME format.

4. The method of claim 1, wherein said semantic foci includes a plurality of types of information, the plurality of types including one or more of email addresses, URLs, dates, currency values, organization names, names of people, names of places, names of products, names of drugs, names of sports teams, names of diseases, and phone numbers.

5. The method of claim 4, wherein said meta-content index comprises entries sorted by the plurality of types.

6. The method of claim 4, wherein in one of the plurality of types comprises currency values, and including converting the currency values to a canonical form.

7. The method of claim 4, including annotating said semantic foci within said body.

8. The method of claim 4, including color coding said electronic version of said index and said semantic foci in said body according to said plurality of types.

9. The method of claim 1, including associating hyperlinks with said semantic foci, and incorporating said hyperlinks into one of said meta-content index and said body.

10. The method of claim 1, wherein said meta-content index comprises labels facilitating parsing of the enhanced document.

11. The method of claim 1, wherein said electronic document includes an attachment, and said processing includes analysis of the attachment.

12. The method of claim 1, including generating a summary of said electronic document, and including the summary in the enhanced document.

13. The method of claim 1, wherein said electronic document includes an attachment, and including generating a summary of the attachment, and including the summary in the enhanced document.

14. The method of claim 1, wherein said header includes text suggesting a key subject, and including generating a summary of said electronic document based upon the key subject, and including the summary in the enhanced document.

15. The method of claim 1, wherein said meta-content index includes a summary of all or part of the electronic document.

16. A method for processing an electronic document adapted for delivery to one or more recipients, the electronic document including a header and a body, the method comprising:
    processing the electronic document using a program to automatically identify semantic foci;
    creating a meta-content index corresponding to said semantic foci; and combining said meta-content index with the header and the body to provide an enhanced document;
    wherein said semantic foci includes at least one date within the body, and further including identifying a document date within the header; and
    associating a presentation attribute to said at least one date in said meta-content index, the presentation attribute based upon a temporal relationship between the document date and the at least one date.

17. The method of claim 16, including converting the at least one date to canonical form.

18. The method of claim 16, wherein the presentation attribute comprises color.

19. A method for processing an electronic document adapted for delivery to one or more recipients, the electronic document including a header and a body, the method comprising:
    performing meta-content extraction of semantic foci within said electronic document using a program, the semantic foci comprising a plurality of types of information including one or more of email addresses, URLs, dates, currency values, organization names, names of people, names of places, names of products, names of drugs, names of sports teams, names of diseases, and phone numbers;
    creating a meta-content index of the electronic document based upon said extracted semantic foci;

arranging the meta-index according to said plurality of types;

combining said meta-content index with said header and said body to provide an enhanced document; and sending said enhanced document to said one or more recipients via a communication network;

wherein said semantic foci includes at least one date within the body, further including identifying a document date within the header; and associating a presentation attribute to said at least one date in said index, the presentation attribute based upon a temporal relationship between the document date and the at least one date.

20. The method of claim 19, including converting the at least one date to canonical form.

21. The method of claim 19, wherein the presentation attribute comprises color.

22. The method of claim 19, wherein in one of the plurality of types comprises currency values, and including converting the currency values to a canonical form.

23. The method of claim 19, including annotating said semantic foci within said body.

24. The method of claim 19, including color coding said electronic version of said index and said semantic foci in said body according to said plurality of types.

25. The method of claim 19, including associating a hyperlink with one of said extracted semantic foci, and incorporating said hyperlink into one of said metacontent index and said body.

26. The method of claim 19, including adding presentation attributes to entries in said meta-content index according to said plurality of types.

27. The method of claim 19, including adding presentation attributes to entries in said meta-content index within one of said plurality of types, according to relationships among said entries within said one of said plurality of types.

28. The method of claim 19, wherein said meta-content index comprises labels facilitating parsing of the enhanced document.

29. The method of claim 19, wherein said electronic document includes an attachment, and said meta-content extraction includes analysis of the attachment.

30. The method of claim 19, including generating a summary of said electronic document, and including the summary in the enhanced document.

31. The method of claim 19, wherein said electronic document includes an attachment, and including generating a summary of the attachment, and including the summary in the enhanced document.

32. The method of claim 19, wherein said header includes text suggesting a key subject, and including generating a summary of said electronic document based upon the key subject, and including the summary in the enhanced document.

33. The method of claim 19, wherein said meta-content index includes a summary of all or part of the electronic document.

34. A method for processing an electronic document adapted for delivery to one or more recipients, the electronic document comprising an electronic mail document including a header and a body, the method comprising:

performing meta-content extraction of semantic foci within said electronic document using a program, the semantic foci comprising a plurality of types of information including one or more of email addresses, URLs, dates, currency values, organization names, names of people, names of places, names of products, names of drugs, names of sports teams, names of diseases, and phone numbers;

creating a meta-content index of the electronic document based upon said extracted semantic foci comprising one or more objects expressed in said markup language adapted for presentation with body in said enhanced document;

arranging the meta-index according to said plurality of types; combining said meta-content index with said header and said body to provide an enhanced document; and sending said enhanced document to said one or more recipients via a communication network.

35. The method of claim 34, wherein said electronic document comprises a document in a format compliant with a standard MIME format.

36. An article of manufacture comprising:

a computer readable medium having computer readable program code which upon execution provides a data processing method including:

automatically processing an electronic document which comprising an electronic mail document includes a header and a body using the program code to identify semantic foci;

creating a meta-content index corresponding to said semantic foci comprising one or more objects expressed in a markup language adapted for presentation with the body of the electronic document; and combining said meta-content index with the header and the body to provide an enhanced document.

37. The article of claim 36, wherein said method includes preparing said enhanced document for delivery to one or more recipients.

38. The article of claim 37, wherein said electronic document comprises a document in a format compliant with a standard MIME format.

39. The article of claim 36, wherein said method includes sending the enhanced electronic document to said one or more recipients.

40. The article of claim 36, wherein said semantic foci includes a plurality of types of information, the plurality of types including one or more of email addresses, URLs, dates, currency values, organization names, names of people, names of places, names of products, names of drugs, names of sports teams, names of diseases, and phone numbers.

41. The article of claim 40, wherein said meta-content index comprises entries sorted by the plurality of types.

42. The article of claim 40, wherein in one of the plurality of types comprises currency values, and wherein said method includes converting the currency values to a canonical form.

43. The article of claim 40, wherein said method includes annotating said semantic foci within said body.

44. The article of claim 40, wherein said method includes color coding said electronic version of said index and said semantic foci in said body according to said plurality of types.

45. The article of claim 36, wherein said method includes associating hyperlinks with said semantic foci, and incorporating said hyperlinks into one of said meta-content index and said body.

46. The article of claim 36, wherein said meta-content index comprises labels facilitating parsing of the enhanced document.

47. The article of claim 36, wherein said electronic document includes an attachment, and said processing includes analysis of the attachment.

48. The article of claim 36, wherein said method includes generating a summary of said electronic document, and including the summary in the enhanced document.

49. The article of claim 36, wherein said electronic document includes an attachment, and wherein said method includes generating a summary of the attachment, and including the summary in the enhanced document.

50. The article of claim 36, wherein said header includes text suggesting a key subject, and wherein said method includes generating a summary of said electronic document based upon the key subject, and including the summary in the enhanced document.

51. The article of claim 36, wherein said meta-content index includes a summary of all or part of the electronic document.

52. An article of manufacture comprising:
a computer readable medium having computer readable program code which upon execution provides a data processing method including:
automatically processing an electronic document which includes a header and a body using the program code to identify semantic foci;
creating a meta-content index corresponding to said semantic foci; and
combining said meta-content index with the header and the body to provide an enhanced document;
wherein said semantic foci includes at least one date within the body, and wherein said method further includes identifying a document date within the header; and
associating a presentation attribute to said at least one date in said meta-content index, the presentation attribute based upon a relationship between the document date and the at least one date.

53. The article of claim 52, wherein said method includes converting the at least one date to canonical form.

54. The article of claim 52, wherein the presentation attribute comprises color.

55. A system for enhancing an electronic document comprising an electronic mail document including a header and a body in a computer including:
a computer, including an electronic mail client having programmatic resources for composing an electronic document having a header and a body, and for sending electronic documents to one or more recipients; and
programmatic resources coupled with the electronic mail client in the computer which process said electronic document to identify semantic foci within the document;
create a meta-content index corresponding to said semantic foci comprising one or more objects expressed in a markup language adapted for presentation with the body of the electronic document; and
combine said meta-content index with the header and the body to provide an enhanced document.

56. The system of claim 55, wherein said resources provide said enhanced document to said email client for delivery to one or more recipients.

57. The system of claim 55, wherein said electronic document comprises a document in a format compliant with a standard MIME format.

58. The system of claim 55, wherein said semantic foci includes a plurality of types of information, the plurality of types including one or more of email addresses, URLs, dates, currency values, organization names, names of people, names of places, names of products, names of drugs, names of sports teams, names of diseases, and phone numbers.

59. The system of claim 58, wherein said meta-content index comprises entries sorted by the plurality of types.

60. The system of claim 58, wherein in one of the plurality of types comprises currency values, and wherein said resources convert the currency values to a canonical form.

61. The system of claim 58, wherein said resources annotate said semantic foci within said body.

62. The system of claim 58, wherein said resources color code said electronic version of said index and said semantic foci in said body according to said plurality of types.

63. The system of claim 55, wherein said resources associate hyperlinks with said semantic foci, and incorporate said hyperlinks into one of said meta-content index and said body.

64. The system of claim 55, wherein said meta-content index comprises labels facilitating parsing of the enhanced document.

65. The system of claim 55, wherein said electronic document includes an attachment, and said resources which process the electronic document analyze the attachment.

66. The system of claim 55, wherein said resources which process the electronic document generate a summary of said electronic document, and include the summary in the enhanced document.

67. The system of claim 55, wherein said electronic document includes an attachment, and wherein said resources which process the electronic document generate a summary of the attachment, and include the summary in the enhanced document.

68. The system of claim 55, wherein said header includes text suggesting a key subject, and wherein said resources which process the electronic document generate a summary of said electronic document based upon the key subject, and include the summary in the enhanced document.

69. The system of claim 55, wherein said meta-content index includes a summary of all or part of the electronic document.

70. A system for enhancing an electronic document including a header and a body in a computer including:
a computer, including an electronic mail client having programmatic resources for composing an electronic document having a header and a body, and for sending electronic documents to one or more recipients; and
programmatic resources coupled with the electronic mail client in the computer which process said electronic document to identify semantic foci within the document;
create a meta-content index corresponding to said semantic foci; and
combine said meta-content index with the header and the body to provide an enhanced document;
wherein said semantic foci includes at least one date within the body, and wherein said resources identify a document date within the header; and
associate a presentation attribute to said at least one date in said meta-content index, the presentation attribute based upon a relationship between the document date and the at least one date.

71. The system of claim 70, wherein said resources convert the at least one date to canonical form.

72. The system of claim 70, wherein the presentation attribute comprises color.

73. An enhanced electronic document produced according to a method for processing an electronic document adapted for delivery to one or more recipients, the electronic document comprising an electronic mail document including a header and a body, the method comprising:
processing the electronic document using a program to identify semantic foci within the electronic document;
creating a meta-content index corresponding to said semantic foci comprising one or more objects expressed in a markup language adapted for presentation with the body of the electronic document; and
combining said meta-content index with the header and the body to provide said enhanced document.

74. The enhanced electronic document of claim 73, wherein said electronic document comprises a document in a format compliant with a standard MIME format.

75. The enhanced electronic document of claim 73, wherein said semantic foci includes a plurality of types of information, the plurality of types including one or more of email addresses, URLs, dates, currency values, organization names, names of people, names of places, names of products, names of drugs, names of sports teams, names of diseases, and phone numbers.

76. The enhanced electronic document of claim 75, wherein said metacontent index comprises entries sorted by the plurality of types.

77. The enhanced electronic document of claim 75, wherein in one of the plurality of types comprises currency values, and the method includes converting the currency values to a canonical form.

78. The enhanced electronic document of claim 75, wherein the method includes annotating said semantic foci within said body.

79. The enhanced electronic document of claim 75, wherein the method includes color coding said electronic version of said index and said semantic foci in said body according to said plurality of types.

80. The enhanced electronic document of claim 73, wherein the method includes associating hyperlinks with said semantic foci, and incorporating said hyperlinks into one of said meta-content index and said body.

81. The enhanced electronic document of claim 73, wherein said metacontent index comprises labels facilitating parsing of the enhanced document.

82. The enhanced electronic document of claim 73, wherein said electronic document includes an attachment, and said processing includes analysis of the attachment.

83. The enhanced electronic document of claim 73, wherein said method includes generating a summary of said electronic document, and including the summary in the enhanced document.

84. The enhanced electronic document of claim 73, wherein said electronic document includes an attachment, and wherein said method includes generating a summary of the attachment, and including the summary in the enhanced document.

85. The enhanced electronic document of claim 73, wherein said header includes text suggesting a key subject, and wherein said method includes generating a summary of said electronic document based upon the key subject, and including the summary in the enhanced document.

86. The enhanced electronic document of claim 73, wherein said metacontent index includes a summary of all or part of the electronic document.

87. An enhanced electronic document produced according to a method for processing an electronic document adapted for delivery to one or more recipients, the electronic document including a header and a body, the method comprising:
processing the electronic document using a program to identify semantic foci within the electronic document;
creating a meta-content index corresponding to said semantic foci; and
combining said meta-content index with the header and the body to provide said enhanced document;
wherein said semantic foci includes at least one date within the body, and the method further includes identifying a document date within the header; and
associating a presentation attribute to said at least one date in said meta-content index, the presentation attribute based upon a temporal relationship between the document date and the at least one date.

88. The enhanced electronic document of claim 87, wherein the method includes converting the at least one date to canonical form.

89. The enhanced electronic document of claim 87, wherein the presentation attribute comprises color.

* * * * *